United States Patent [19]

Soehngen

[11] 3,819,452
[45] June 25, 1974

[54] APPARATUS FOR THE PRODUCTION OF SPRAY SPUN NONWOVEN SHEETS

[75] Inventor: John W. Soehngen, Berkeley Heights, N.J.

[73] Assignee: Celanese Corporation, New York, N.Y.

[22] Filed: May 1, 1972

[21] Appl. No.: 249,299

Related U.S. Application Data

[60] Division of Ser. No. 96,041, Dec. 8, 1970, Pat. No. 3,676,239, which is a continuation-in-part of Ser. No. 580,994, Sept. 21, 1966, Pat. No. 3,607,588.

[52] U.S. Cl. ................ 156/441, 156/500, 156/510
[51] Int. Cl. ........................................... B29c 13/00
[58] Field of Search ........... 156/180, 209, 259, 306, 156/244, 440, 441, 500, 553; 264/148, 151, 309, 310

[56] References Cited
UNITED STATES PATENTS

| 3,607,567 | 9/1971 | Fairbans | 156/500 |
| 3,707,838 | 1/1973 | Dorschner et al. | 264/151 |

Primary Examiner—Douglas J. Drummond
Assistant Examiner—Caleb Weston
Attorney, Agent, or Firm—Andrew F. Sayko, Jr.

[57] ABSTRACT

Apparatus for making fibrous products comprising nozzle means for spray spinning filamentary material, an opposed pair of spaced apart collection having a series of spaced projections on their respective surfaces, means for driving said collectors and means for producing back and forth relative movement between said nozzle means and said collectors.

5 Claims, 8 Drawing Figures

APPARATUS FOR THE PRODUCTION OF SPRAY SPUN NONWOVEN SHEETS

This application is a division of application Ser. No. 96,041, filed Dec. 8, 1970, now U.S. Pat. No. 3,676,239, which in turn is a continuation-in-part of Ser. No. 580,994, filed Sept. 21, 1966, now U.S. Pat. No. 3,607,588.

BACKGROUND OF THE INVENTION

This invention relates to spray-spun fibrous sheets and to a method and apparatus for producing continuous spray-spun sheets.

Various methods have previously been advanced for producing nonwoven fibrous materials and the like directly from extruded fiber-forming materials. In general, these methods form non-woven materials by extruding a fiber-forming polymer in liquid form through a plurality of orifices to form a like number of filaments which are either collected directly, or following an intermediate drawing stage, on a moving surface in the form of a mat. Examples of such methods are disclosed in U.S. Pat. Nos. 2,206,058; 2,382,290; and 2,810,426.

More recently, spray-spinning processes and apparatus have been developed which permit the formation of substantially continuous filaments at high production rates without the concurrent formation of shot and other undesirable physical forms such as a predominance of very short fiber elements. The aforementioned spray-spinning processes and apparatus have been used to produce spray-spun fibrous bodies comprising randomly arranged filaments having a varying degree of crystalline orientation and a varying filament diameter along their lengths. These nonwoven spray-spun fibrous materials eliminate or substantially lessen the need for various subsequent bonding treatment by random thermal and/or adhesive bonding. The filaments are bonded to each other at crossover points and the self-bonding gives the spray-spun structure substantial coherency in addition to some degree of filament entanglement.

In accordance with an embodiment of the invention, spinning nozzle means are provided with an extrusion orifice for the fiber-forming material and with a plurality of gas outlet passages spaced apart about the extrusion orifice to supply jets of high velocity gas for contacting the extruded filament stream prior to hardening of the filament. The directions of the gas jets are such that substantial drag forces are applied to the extruded filament stream in the direction of extrusion for attenuating or drawing the material leaving the extrusion orifice. Further, the gas passages are inclined so that their axes do not intersect the axis of the extrusion orifice. These directional characteristics have been found to be particularly significant in preventing the formation of shot and preventing freeze-ups of the extrusion nozzle. They also serve to permit achievement of the desired high rate of production of filamentary materials in which the filaments are substantially continuous.

While still in the zone of influence of the gas streams, the filament is deposited on collector means that preferably moves continuously. The gas flow swirls the filament sections about in a random expanding conical pattern and they reach the collector while their surfaces are somewhat tacky so that sufficient self bonding occurs to preserve to a substantial extent the relationships established at the time of deposit on the collector. These relationships may include interesting three-dimensional effects contributing significantly to product bulk.

The invention may be used in connection with the production of products from any of the various materials that may be melted and extruded through an orifice to form a filament. Examples of suitable types of fiber-forming materials are preferably organic fiber-forming materials such as polyolefins, polyamides, polyesters, polyurethanes, cellulose acetate, polyvinyl acetate, poly(methyl methacrylate), styrene copolymers, and the like. Polyolefins such as polyethylene and polypropylene, and polyamides such as nylon 66, have sufficiently low melt temperatures and sufficiently low melt viscosities, and they are therefore particularly convenient to use. Even materials which are normally difficult to melt without decomposition, such as cellulose acetate, may be used by adding a high boiling plasticizer as a melt depressant, if necessary. Inorganic fibers such as glass can also be spun using the present apparatus and process but are normally less preferable.

Nonwoven fibrous materials made by spray spinning should have sufficient structural coherency and stability to retain their identity when handled manually or mechanically. The fibers or filaments themselves must not be made so resistant to stretching as to become brittle or susceptible to breaking when subjected to various operations to improve their properties for a particular end use. Nonwovens having insufficient tensile strength generally do not retain their dimensions on handling, due to their own weight. However, the spray-spinning operation may be controlled to obtain the desired amount of tensile strength by self-bonding of the tacky fibers to each other. A bonding agent may also be utilized to increase or achieve the desired bonded strength to maintain maximum structural coherency.

OBJECTS OF THE INVENTION

It is an object of this invention to provide a novel method for producing continuous spray-spun fibrous sheets.

Another object of this invention is to provide a novel fibrous spray-spun sheet having upper and lower surfaces which are broken or indented to give a puckered effect.

Another object of this invention is to provide a novel fibrous spray-spun sheet having the capability of absorbing and distributing energy forces.

These and other objects will become apparent to those skilled in the art from a description of the invention.

In accordance with a preferred embodiment of the invention, a substantially continuous filament of thermoplastic polymeric material is formed by spray spinning and collected by means of opposed spaced-apart, contrarotating (with respect to the direction of extrusion) collection surfaces, e.g., collection rolls, disposed in the path of the material issuing from the extrusion orifice. The rotating rolls have a series of spaced projections, e.g., spikes or pins protruding from each roll surface.

In operation, as the rolls rotate inwardly, fiber from the spray nozzle is directed to the gap between the rolls and partially bridges the gap by falling on the pins and rolls. The pins act as collection points and in a large measure prevent the largely continuous spray spun fiber from flying through the gap. This also tends to keep more fiber in vertical alignment than if the pin projections were removed.

The gap between the projections on one roll to the projections on the other roll is substantial, and only portions of the spray-spun filamentary material are deposited directly upon the projections on the roll surfaces. The remainder of the filamentary material crosses back and forth randomly between the layers of material deposited on the projections of each roll surface to form a bridging structure connecting the layers.

Some bonding together of the filament sections ordinarily is desirable. The rolls are located close enough to the spray spinning nozzle to receive the filamentary material while surface portions of the filament sections are sufficiently tacky to permit a degree of self-bonding at cross-over points.

As the rolls rotate, the collected filamentary material is removed from the collection zone in the form of a continuous nonwoven mat or batt of fibers in a three-dimensional network having surface layers in which the fiber components are generally parallel to the fabric surfaces and having an interior core in which the fiber components extend at angles to the surfaces. The upper and lower surfaces of the nonwoven fabrics are broken or indented to give a puckered effect. Thus, the otherwise smooth surface is broken up by fibers being directed to the center of the structure because of the projections and rotation of the rolls. The points of agglomeration arising from the presence of the projections result in an intermittent column-like interior which reinforces the entire assembly.

The relative thicknesses of the different fabric zones may be regulated by suitable adjustment of such factors as the gap between the projections on one roll to the projections on the other roll, the spacing of the rolls from the spray spinning nozzle and the speed of rotation of the rolls. In producing the high bulk products of this invention, it ordinarily is desirable that the individual surface layers have a thickness no greater than one-third of the thickness of the product. More preferably, each of the surface layers should have a thickness less than one-sixth of the total fabric thickness, leaving over half of the fabric thickness to be taken up by the bridging structure constituting the interior core.

Although pins or tacks are easily used, other more effective projections or shapes may be used. The width or diameter, length or depth and spacing of the projections and corresponding indentations in the fibrous product may be varied to obtain the most effective geometric pattern. Preferably the projections: 1) will have a width of from about one sixty-fourth inch to one-eighth inch, 2) will have a length of from about one-eighth inch to 1 inch and 3) will be spaced apart from about three-sixteenths inch to three-fourths inch so that the number of projections or indentations ranges from about 225 to 4000 per square foot.

In accordance with another aspect of the invention, fibrous subassemblies contributing significantly to the overall fabric properties may be formed during the collection of the spray spun filamentary material. In one embodiment, the collector rolls are traversed laterally back and forth in front of the spinning nozzle in such a manner as to produce during each traverse a generally U-shaped sheet, the ends of which are adjacent the roll surfaces and the central portion of which bridges the gap from the projections on one roll to the projections on the other roll. As the traversing continues, the successively collected U-shaped sheet-like units are combined into a nonwoven fabric in which overlapping and contacting end portions of a number of the U-shaped sheets are consolidated as surface layers or skins which are broken or indented to give a puckered effect and in which the central bridging portions of adjacent sheets are spaced apart from each other to provide a resilient core formed integrally with the surface layers.

In another embodiment, a plurality of spray spinning nozzles are arranged to project filamentary material toward the gap between the projections on the respective opposed collection surfaces of a single collector unit. The spray patterns from adjacent nozzles overlap in the collection zone so that a unitary product will be formed even through the filamentary material issues from different sources. Set-ups of this type are particularly desirable in producing fabrics having zones of different characteristics across the width thereof and in producing wide fabrics without the sheet-like subassemblies which sometimes are formed when a traverse motion is employed.

The invention also contemplates the production of pile-like nonwoven fabrics. The fibrous body removed from the collection zone through the gap between the projections on the respective opposed collector surfaces may be severed or slit lengthwise at a level between the surface layers deposited on the collector surfaces to provide two fabrics in each of which the surface layer serves as a backing and the attached portion of the bridging structure projects upwardly from the backing. The nature of the upstanding material or "pile" will depend, of course, upon the conditions maintained during collection of the spray spun fiber, and a variety of effects can be achieved. For example, the upstanding material on the surface of the fabric may be thin sheet-like subassemblies forming transversely extending leaves. This particular effect is achieved by slitting an assembly collected on a set-up having a traverse motion and operating as described above to produce a series of thin, generally U-shaped, sheet-like subassemblies as the spray pattern moves laterally back and forth across the collector surfaces.

A more complete understanding of these and other features of the invention will be gained from a consideration of the following description of certain embodiments illustrated in the accompanying drawings, in which.

Figure 1:
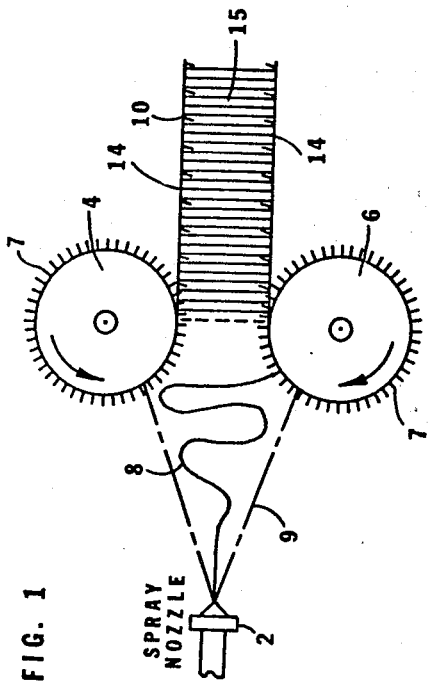
FIG. 1 is a schematic elevational view depicting one form of apparatus setup that may be used in practicing the invention.

Spray spinning nozzle means are indicated schematically at 2 in FIG. 1. Preferred nozzle structures are disclosed in patent application Ser. No. 740,913, filed June 28, 1968, now U.S. Pat. No. 3,543,332, and for detailed information on these structures, reference should be made to such application. It will be sufficient to point out here that the preferred spray spinning nozzle is provided with an orifice through which the molten fiber-forming material is extruded and is also provided with a plurality of gas passages disposed about the axis of the extrusion orifice. The gas passages are inclined to direct heated gas, such as steam, along paths the axes of which converge toward but do not intersect the projected axis of the extrusion orifice. The high velocity gas streams issuing from the gas passages attenuate the filament extruded through the extrusion orifice and project the filament away from the nozzle in a random swirling expanding conical pattern.

The collector unit depicted in FIG. 1 includes a pair of opposed, spaced-apart rolls 4 and 6 mounted for rotation in a suitable frame and having projections 7 on the surfaces of rolls 4 and 6. The rolls 4 and 6 are spaced a predetermined distance from the nozzle 2, and the gap between the projections 7 on the respective rolls is in substantial alignment with the central axis of the nozzle 2.

The filament 8 is projected in a generally longitudinal direction from the nozzle 2, but increments thereof deviate randomly from the extrusion orifice axis due to the high filament velocity and the effects of the gas issuing from the nozzle. The overall result is a spray pattern that is generally conical in outline as indicated schematically at 9 in FIGS. 1 and 2.

Figure 2:
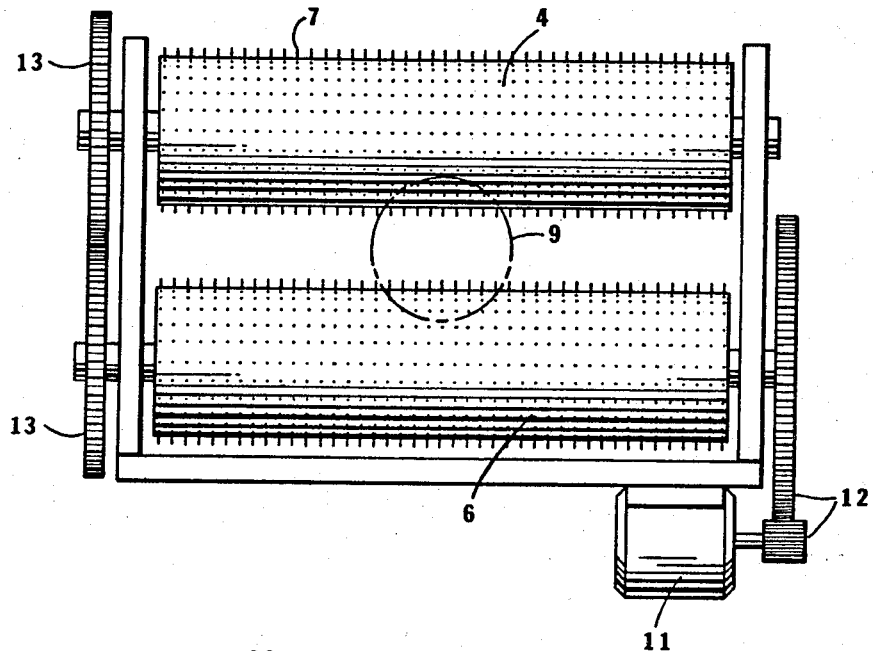
FIG. 2 is a face view of the collector roll assembly shown in FIG. 1.

In establishing the proper spacial relationship between the nozzle 2 and the collector unit, consideration should be given to the shape and size of the spray pattern 9 in the collection zone. As indicated in FIG. 2, the diameter of the spray pattern 9 should be greater than the gap between the projections 7 on the respective surfaces of the collection rolls 4 and 6. When this relationship exists, portions of the projected filamentary material will be deposited directly upon the projections 7 and on the surfaces of the rolls 4 and 6 and other portions will be swirled about randomly to bridge the gap between the rolls.

The extent to which the freshly-spun filamentary material hardens prior to collection also is affected by the spacing between the nozzle 2 and the collection unit. Ordinarily, it is desirable that collection take place while the surfaces of the filamentary material are still sufficiently tacky to effect self-bonding as between filament sections at crossover points. If other facts are held constant, the degree of self-bonding may be varied by changing the distance from the nozzle 2 to the projections 7 in the surfaces of collection rolls 4 and 6. Control over the degree of self-bonding achieved may also be exercized by regulation of the extrusion temperature at the nozzle 2 and/or by heating or cooling the projections 7 and/or surfaces of the collection rolls 4 and 6.

In instances where supplemental fiber-to-fiber bonding may be desired, suitable binders and/or plasticizers may be employed. For example, compositions compatible with the fiber-forming material may be added to the melt supplied to the extrusion orifice, or spraying techniques may be used to apply suitable compositions to the filamentary material either in the zone of collection thereof or at a subsequent stage of the process.

As the collection rolls 4 and 6 are rotated in the directions indicated by the arrows in FIG. 1, the collected filamentary material is removed from the collection zone through the gap between the projections 7 on the respective rolls in the form of a nonwoven fabric product 10. Any suitable drive means may be employed for rotating the rolls 4 and 6. In FIG. 2, the drive means has been shown as including a motor 11, gear means 12 coupling the motor 11 to the shaft of roll 6, and gears 13 coupling together the rolls 4 and 6 for rotation at the same speed but in opposite directions.

The nonwoven fabric 10 has a distinctive structure. This structure includes upper and lower surface layers 14 spaced apart by an integrally formed core 15. The surface layers 14 are made up of the fiber deposited upon the projections 7 of the collector rolls 4 and 6, and these surface layers are broken or indented to give a puckered effect. The predominant orientation of the filamentary material in the surface layers is parallel to the surface of the product 10. However, a significantly different orientation exists in the core 15. The fiber components here are those that were collected as bridging units extending across the gap between the projections 7 on the respective collector rolls 4 and 6, and their predominant orientation is at an angle to the faces or surfaces of the product 10 and can even be substantially perpendicular to the surface.

The density characteristics of the zones 14 and 15 also are different. In the surface layers 14 the filamentary components are packed closely together. The relatively dense upper and lower surface layers 14 confer a degree of rigidity to the structure and are connected by a fibrous network. Most of the bridging or connecting portion 15 is in the form of a network having substantial open spaces between fibrous components. Part of the network has the appearance of column-like agglomerations of fibers which act to consolidate the two structures. The column-like agglomerations result from the densification of the part of the fibrous network which is collected directly on the projections on the collection device. The less dense network having substantial open space between fibrous components results from the collection of part of the fibrous network between the projections. If the projections are spaced in frequent enough intervals on their respective collection devices, the open network portions of the structure will have been collected on the smooth portions of the rolls.

The thickness of the fabric 10 is determined by the gap between the projections 7 as well as between collector rolls 4 and 6. Normally it will be found desirable to mount the rolls so as to permit adjustment of their relative positions, so that fabrics of different thicknesses may be produced. The gap between the projections 7 of convergent surfaces of the rolls 4 and 6 should be in the range of from about one-eighth inch to about 4 inches in thickness, and more preferably within the range from about one-half inch to about 2 inches.

Figure 3:
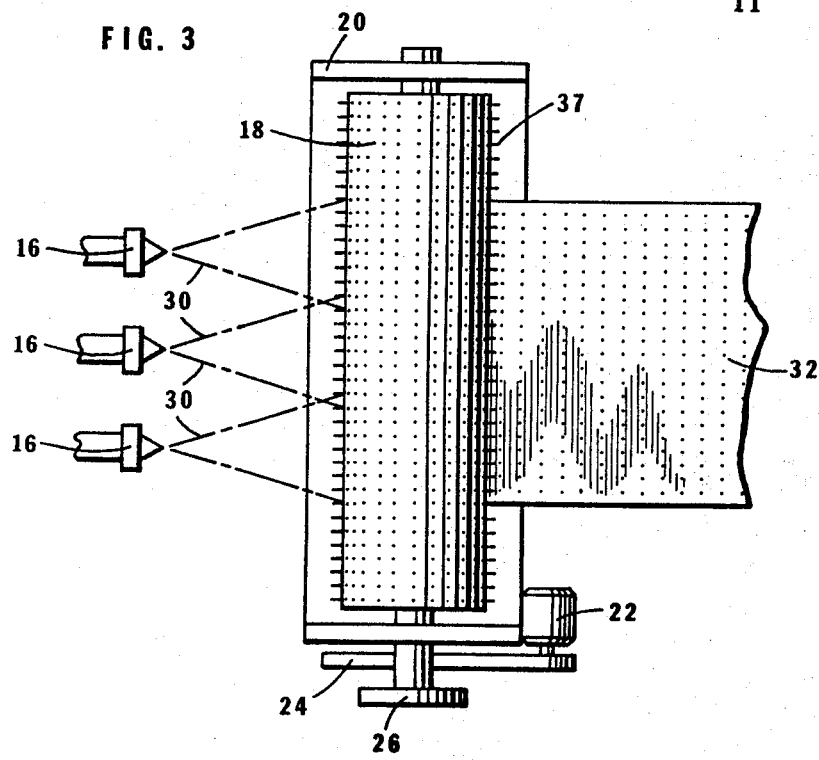
FIG. 3 is a top view of an apparatus setup similar to that illustrated in FIG. 1 but having a plurality of spray spinning nozzles associated with a single collector unit.

Although a single spray spinning nozzle is indicated in FIG. 1, the use of a plurality of such nozzles is preferable in some instances. Such an embodiment of the invention is illustrated in FIG. 3. This embodiment includes a plurality of spray nozzles 16 disposed in alignment with the gap between the projections 37 mounted on the respective surfaces of a single pair of opposed collector rolls 18. The rolls are mounted in a frame 20. A motor 22 on the frame drives a belt 24, which passes over a pulley on the end of the shaft for the lower roll 18, and the shaft for the upper roll 18 is connected with the lower roll by a crossed belt 26. Thus, the rolls 18 rotate in opposite directions when the motor 22 is operating.

The positional relationships between the several nozzles 16 are such that the spray patterns 30 from adjacent nozzles overlap in the collection zone. With this arrangement, a wide nonwoven fabric 32 is produced during operation of the equipment. This fabric 32 is similar to the fabric 10 described above in connection with FIG. 1 in the sense that it is made up of surface layers which are broken or indented to give a puckered effect and the layers are connected together by bridging fiber components. In the widthwise direction the fabric 32 may be substantially uniform from zone to zone across the fabric or it may be characterized by zones that are different from one another.

Transverse uniformity is achieved when the overlap between the spray patterns from adjacent ones of the nozzles 16 is sufficient to assure delivery of substantially the same amount of filamentary material to all portions of the collector zone. On the other hand, where density variations in the transverse direction are desired, the overlap between adjacent spray patterns from the nozzles 16 may be such as to cause the delivery of filamentary material to one portion of the collector to be greater than the delivery of filamentary material to another portion thereof.

Still other effects may be achieved in the embodiment of FIG. 3 by supplying fiber-forming materials having different characteristics to various ones of the several nozzles 16, and/or by using nozzles having extrusion orifices of different sizes or different rate of delivery. The spray patterns of several nozzles 16 may overlap to the extent of intermingling filaments during formation of the mat or fabric. Different materials may be sprayed simultaneously from the nozzles to produce a fabric having a uniform dispersion of filaments of different materials. The nozzles may be arranged along an axis perpendicular to the width dimension of the gap between the collector rolls, or any other suitable arrangement of nozzles may be used. By arranging a plurality of nozzles side by side along an axis parallel to the width of the gap, a nonwoven fabric 32 may be produced that is characterized by the presence of longitudinally extending portion or stripes having different visual or structural properties. For example, in some applications for the high bulk nonwoven fabrics of this invention, it is desirable that the fabrics be provided with a defined flex-zone susceptible of being bent more readily than other portions of the fabric. Such a zone can be formed by spray spinning from one of the nozzles 16 filamentary material of significantly smaller average denier than the filamentary material issuing from the other nozzles 16.

Figure 4:
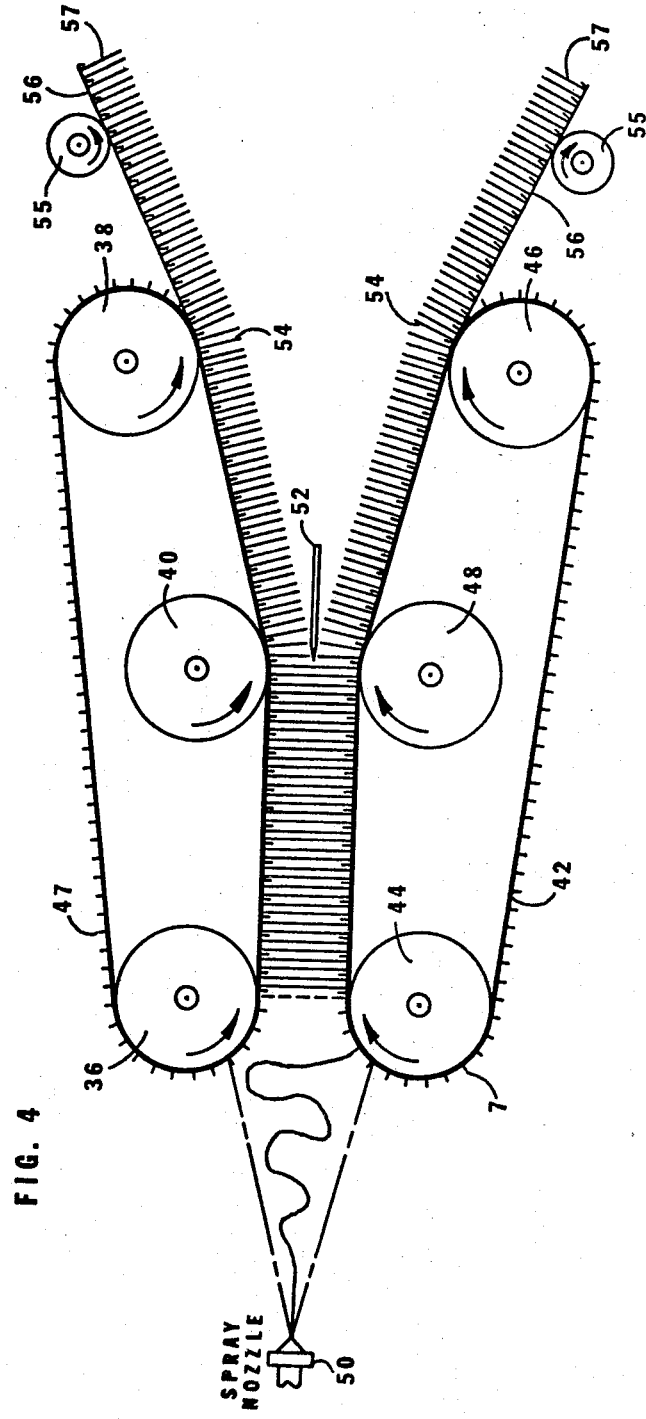
FIG. 4 is an elevational view depicting another form of collector structure and also illustrating the formation of pile-like nonwoven fabrics in accordance with the invention.

In the embodiment illustrated in FIG. 4, an endless belt 34 having projections 7 mounted on its surface is mounted over rolls 36 and 38 and over an idler roll 40 which supports the intermediate portion of the belt 34. An opposing belt 42 is mounted between the rolls 44 and 46 and passes over an idler roll 48.

A spray spinning nozzle 50 corresponding to the nozzle 2 in FIG. 1 is positioned opposite the gap between the belts 34 and 42 in the zone of the rolls 36 and 44. Collection of the filamentary material issuing from the nozzle 50 takes place in much the same manner as in FIG. 1. Portions of the filamentary material are deposited directly upon the projections 47 and surfaces of the belts 34 and 42 and other portions bridge back and forth across the gap. As the rolls rotate in the directions indicated by the arrows, the collected material is removed from the collection zone in the form of a nonwoven fabric structure.

In the area between the front rolls 36 and 44 and the idler rolls 40 and 48, the fiber contacting flights of the belts 34 and 42 are substantially parallel. These surfaces and the projections 47 mounted thereon maintain the newly formed nonwoven fabric to the dimension of the gap and serve to minimize the mechanical loads imposed on the material.

The nonwoven fabric product delivered by the belts 34 and 42 in the zone of the idler rolls 40 and 48 is similar to the product 10 produced as described in connection with FIG. 1, and this product may be used as such if desired. However, FIG. 4 illustrates an additional operation that may be carried out in forming other novel products in accordance with the invention. Severing means 52 is disposed between the belts 34 and 42 just beyond the idler rolls 40 and 48. This severing means 52 may be in the form of stationary cutter blade, a reciprocating saw or blade, a band saw, or other suitable fiber severing device.

The level of the severing means 52 is such that it contacts the fiber components bridging the vertical space between the surface layers of the fibrous body being advanced by the belts 34 and 42. The severance of these bridging components across the entire width of the body yields two separate fabrics 54. These move with the diverging flights of the belts 34 and 42 in the zone between the idler rolls 40 and 48 and the back rolls 38 and 46, and they are individually guided away by suitable means 55 for separate collection.

Each of the nonwoven fabrics 54 is pile-like in character. The surface layer of the filamentary material deposited on one of the belts of the collector constitutes a firm backing structure 56, and the severed portion 57 of the bridging fiber components extends from the backing in flexible pile-like configurations. These nonwoven pile-like fabrics may be produced economically and they are suitable for use in many of the environments where conventional pile fabrics have been employed heretofore.

In producing these pile-like fabrics, it is not essential that a belt-type collector unit be employed. Apparatus having roll-type collector units as shown in FIGS. 1–3 can be used for the production of pile fabrics by disposing suitable severing means downstream of the gap between the rolls. Generally, however, it will be found preferable to utilize a belt-type collector, because belts such as those shown at 34 and 42 in FIG. 4 provide relatively large surface areas for advancing the fibrous assembly against the severing means 52.

Figure 5:
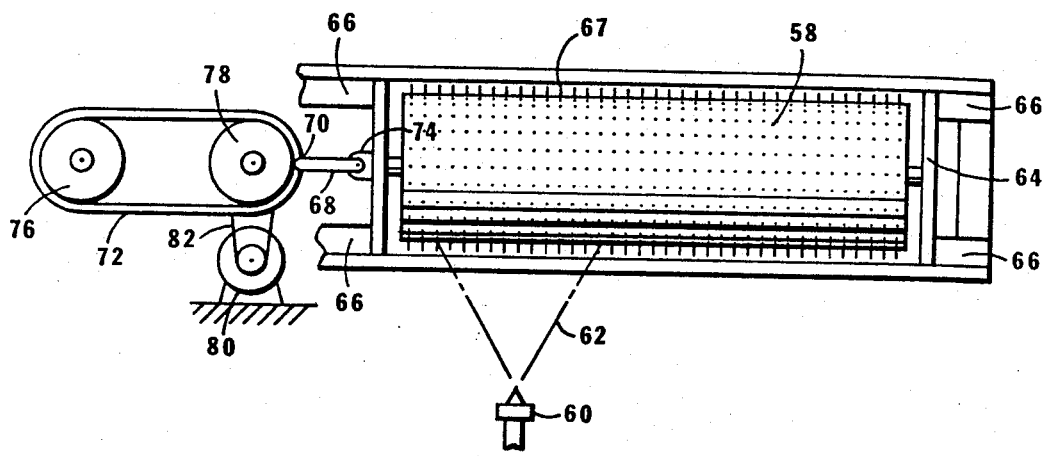
FIG. 5 is a schematic top view of another embodiment of the invention in which the collector unit is traversed bodily back and forth in front of the spray spinning means.
Figure 6:
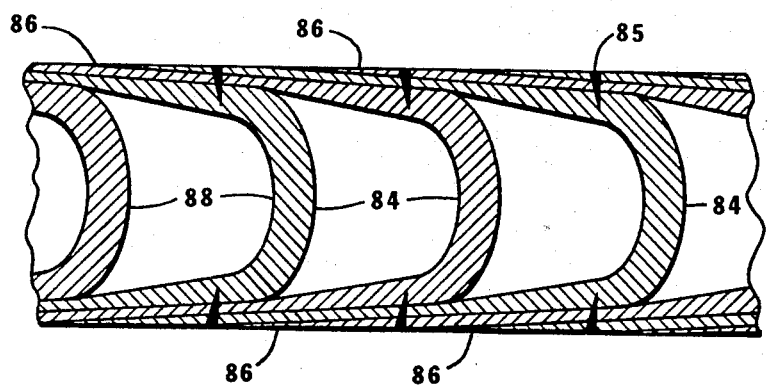
FIG. 6 is a diagrammatic view of the fibrous subassemblies produced during traverse motions of the collector unit of the apparatus of FIG. 5.

Still other aspects of the invention are illustrated in connection with FIGS. 5–7 of the drawings. FIG. 5 illustrates schematically an apparatus setup in which relative lateral movement is effected as between spray spinning nozzle means and a collector unit.

A pair of opposed collector rolls 58 having pins 67 on their respective surfaces are disposed in front of spray spinning means 60, with the spray pattern 62 from the nozzle 60 intersecting the gap between the rolls 58. The rolls 58 are mounted for rotation in a frame 64, and the frame 64 is carried by rails 66. The rolls 58 are relatively long, as compared with the diameter of the spray pattern 62 at the collection zone. However, the frame 64 is shifted back and forth along the rails 66 to position different portions of the roll surfaces in the path of the filamentary material issuing from the nozzle means 60.

The traversing motion of the rolls 58 may be accomplished through the use of any suitable drive means. In FIG. 5 the drive means has been illustrated as including a link 68 pivotally connected at one of its ends to a pin 70 projecting from a belt 72 and at its other end to a bracket 74 on the frame 64. The belt 72 is disposed beneath the level of the frame 64 and is trained about rolls 76 and 78. The roll 78 is driven from a motor 80 through suitable coupling means such as a belt 82. Upon operation of the motor 80, the roll 78 is rotated to move the belt 72 through an endless path. As the pin 70 moves along the belt path, the frame 64 traverses back and forth along the rails 66 in front of the nozzle 60.

In this embodiment, it is preferred that a substantial degree of bonding at crossover points between contacting filament sections be achieved in the collection zone. This normally presents no difficulty because it usually is feasible to regulate the extrusion temperature and/or the spacing between the nozzle 60 and the collector rolls 58 so that the filamentary material reaches the collection zone while surface portions thereof are still sufficiently tacky to permit self-bonding at crossover points. However, a suitable binder or plasticizer composition may be sprayed into the collection zone along with the filamentary material if desired.

As the zone of intersection between the spray pattern 62 from the nozzle 60 and the pins 67 on collection rolls 58 shifts back and forth across the width of the collection unit, a series of thin sheetlike fibrous subassemblies 84 are formed. Each of the subassemblies is generally U-shaped in configuration, as suggested in FIG. 6, and within each sheet the filament is randomly arrayed in the sense that, if the U-shaped subassembly were flattened into a plane, incremental portions of the filament would be found extending in substantially all directions within the plane.

Of course, the U-shaped subassemblies 84 formed on successive traverses of the collector units are not entirely separate from each other. At the end of one traversing motion and the beginning of the next traversing motion, only a single body of filamentary material is collected, so that successive ones of the subassemblies 84 actually are united at the lateral margins of the fabric. This effect ordinarily is a desirable one, but in those instances where a high degree of widthwide product uniformity is required, the lateral margins of the fabric may be trimmed off.

The upper and lower end portions 86 of adjacent U-shaped subassemblies overlap substantially. These are interentangled somewhat and are packed together to form the surface layers at the top and bottom of the product collected. The surface layers contain indentations 85 surrounded by a dense area of fibers which gives the surface a puckered effect. Portions of at least three and preferably five or more of the subassemblies 84 should be present at any given vertical cross section through one of the surface layers. In these surface layers, the fiber components are generally parallel to the faces of the fabric.

The mid-portions 88 of adjacent ones of the U-shaped subassmblies 84 are spaced apart from each other. This effect is indicated in FIG. 6 and in the view designated FIG. 7. The amount of the spacing between the mid-portions 88 of successive U-shaped subassemblies 84 may be effected by suitable regulation of the surface speeds of the collector rolls 58 in relation to the rate of traverse of the rolls along the rails 66.

The mid-portions 88 of the subassemblies extend at angles to the faces of the nonwoven fabrics. Thus, although the fiber components are randomly arrayed within the individual subassemblies 84, the nonwoven fabric as a whole exhibits different fiber orientations in different zones across the thickness of the fabric. That is to say, the predominant orientation of the fiber components in the surface layers is parallel to the faces of the fabric, while the predominant fiber orientation in the middle of the fabric is at an angle to the fabric faces. This angle varies, of course, from 90° down as one follows a U-shaped subassembly from its mid-point toward a surface layer of the fabric.

Figure 7:
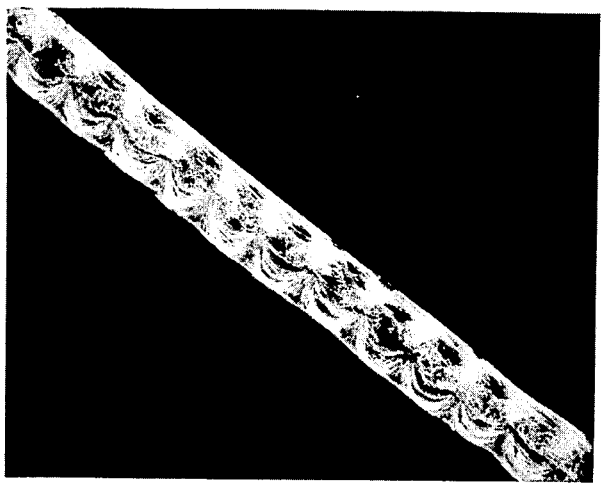
FIG. 7 is a photograph showing in longitudinal cross section a nonwoven fabric produced in accordance with the process of this invention utilizing the apparatus of FIG. 5.
Figure 8:
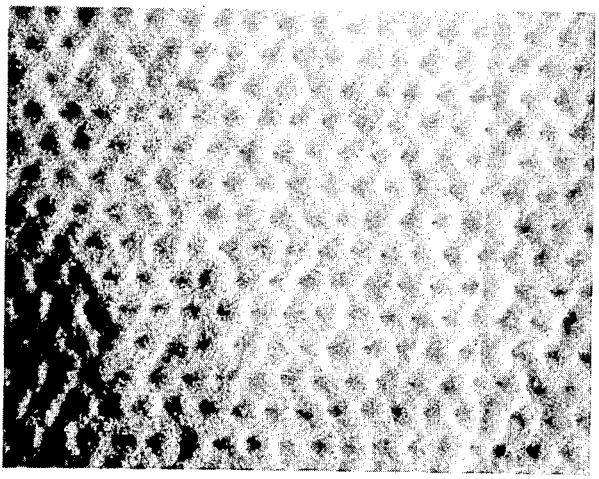
FIG. 8 is a photograph of a top view of a nonwoven fabric produced in accordance with the process of this invention utilizing the apparatus of FIG. 5.

Fabrics of the type illustrated in FIG. 7 may be used as such or they may be subjected to further treatments. Particularly interesting results may be obtained, for example, by slitting a fabric of this type through the mid-portions 88 of the U-shaped subassemblies. This slitting action may be carried out as described above in connection with FIG. 4.

Each of the two fabrics resulting from the slitting operation is characterized by a base or backing structure having a plurality of leaf-like assemblies of fiber components protruding therefrom. The leaf-like bodies may be flexed independently of each other in a manner somewhat analogous to that of the pile of pile fabrics of a more conventional nature. However, the transverse continuity of the leaves gives these fabrics structural properties not heretofore attainable.

The nonwoven structures of this invention can have utility as carpet underlay and liquid or gas filters. In addition, they may be utilized as a self-supporting structure useful in the automotive industry in such areas as padded dashes, arm rests, door panels, sun visors, headliners, etc.

The following examples will serve to further illustrate the invention. All parts are by weight unless otherwise specified.

EXAMPLE I

Polypropylene pellets (Hercules Pro-fax 6423) were fed to a Modern Plastics Machinery extruded (1 × 24″) having three zones maintained at 205°C., 275°C. and 335°C., respectively, and extruded at a screw speed of about 14.5 RPM through a nozzle having a circular orifice of 0.028 inch diameter at a material temperature of about 331°C. The nozzle included three 0.082 inch ports disposed annularly about the orifice, directing streams of steam along paths the axes of which converge toward but did not intersect the extended axis of the extrusion orifice, the closest point to convergence lying about 1 inch from the orifice. The steam had a line pressure of 16 psig and a temperature of about 410° centigrade.

The ports were spaced about 120° apart and the axes were arranged to provide an opening of about one-sixteenth inch in diameter therebetween at the point of closest convergence, through which the extrudate passed. The extrudate was thereupon attenuated and whipped about with little or no breakage, and taken up while still at least tacky and capable of selfbonding at a point 8½ inches from the die orifice at the gap between a pair of stainless steel rolls of 4 inch diameter covered with paper pierced with one-half inch long thumbtacks spaced on one-half inch centers placed on an alternate diamond-shaped pattern, counter-rotating at about 0.11 rpm and providing a one-half inch gap from the projections on one roll to the projections on the other roll through which the material passed in a band of about 3 inches width.

About 7 gm./min. of material was extruded and taken up as about a 30 oz./yd. batting containing principally endless continuous filament ranging in diameter from about 15 to about 55 microns with the changes in diameter having a relatively long period on the order of several inches. The average diameter was about 24 microns, indicating some preponderance of the lower diameters.

The resulting fabric had the firmness, deformability and resilience qualities required of carpet underlayments, with 55 percent compression and 89 percent recovery within 1 minute from the application of a 25 lb./in. load for a period of 1 minute.

Of course, in normal production operations it is desirable to produce carpet padding material in wide strips. A suitable carpet underlay may be provided as 4 × 8 foot sheets or as a continuous matting of e.g., 9 feet width roller about 4 to 6 inch cores, by utilizing a multiplicity of spray nozzles or traversing the take-up surface. The underlayment may also be sprayed directly onto a carpet backing with a suitable binder or may even constitute the secondary backing itself. Such an embodiment is particularly desirable where the carpet backing comprises a similar synthetic polymer such as polypropylene as in the woven form described in U.S. Pat. No. 3,110,905.

EXAMPLE II

Polypropylene was spray spun according to the procedure of Example I except that the polymer melt temperature and distance from the spinning orifice to the initial point of contact with the collection rolls were varied. In addition, the gap from the projections on one roll to the projections on the other roll was one inch. Table I below shows the polymer melt temperatures, collection distances and sample weights for the eight samples prepared, which would be useful as crash padding material.

TABLE I

| Sample No. | Polymer Melt Temp.,°C | Collection Distance (in.) | Sample Weight lb/ft³ | g/ft² |
|---|---|---|---|---|
| 1 | 348 | 10 | 9.25 | 350 |
| 2 | 348 | 10 | 6.58 | 252 |
| 3 | 348 | 10 | 5.83 | 220 |
| 4 | 349 | 10 | 5.22 | 197 |
| 5 | 349 | 11.5 | 4.10 | 158 |
| 6 | 341 | 11.5 | 3.18 | 120 |
| 7 | 341 | 11.5 | 2.12 | 80 |

TABLE I-Continued

While various embodiments of the present invention have been described, the methods and elements described herein are not intended to limit the scope of this invention since changes therein are possible. It is intended that each element recited in any of the following claims is to be understood as referring to all equivalent elements for accomplishing the same result in substantially the same or equivalent manner. It is intended to cover the invention broadly in whateven form its principles may be utilized, being limited only by the following claims.

What is claimed is:

1. Apparatus for making fibrous products comprising nozzle means for spray spinning filamentary material, said nozzle means comprising an orifice through which fiber-forming material may be extruded and a plurality of gas passages disposed about the axis of the extrusion orifice; an opposed pair of convergent spaced apart collectors having a series of spaced apart projections on their respective surfaces, said collectors having their collection surfaces so oriented with respect to each other as to leave a gap between the projections on the respective convergent collection surfaces, said convergent surfaces disposed in the path of the filamentary material issuing from said nozzle means; means for driving said collectors to move the surface portions thereof adjacent the gap in a direction away from the nozzle means so as to remove the collected filamentary material through said gap; and means for producing back and forth relative motion between said nozzle means and said collectors in a direction laterally of the path of the filamentary material issuing from said nozzle means.

2. Apparatus according to claim 1 wherein said movement producing means includes means for reciprocating said collectors laterally relative to said nozzle means, said nozzle means being aligned with said gap during said reciprocating movement.

3. Apparatus according to claim 1 including second nozzle means adjacent said first mentioned nozzle means, said second nozzle means being aligned with said gap to produce a spray pattern overlapping the spray pattern of said first-mentioned nozzle means.

4. Apparatus according to claim 1 wherein said projections have a width of from about one sixty-fourth to one-eighth inch, a height of from about one-eighth to 1 inch, the number of projections ranging from about 225 to 4000 per square foot of collection surface.

5. Apparatus according to claim 1 further including means for severing said fibrous product and means for separating said severed product.

* * * * *